US009692831B1

(12) United States Patent
Manber et al.

(10) Patent No.: US 9,692,831 B1
(45) Date of Patent: Jun. 27, 2017

(54) PAUSING INTERACTIVE SESSIONS

(71) Applicant: Google Inc., Mountain View, CA (US)

(72) Inventors: Udi Manber, Los Altos Hills, CA (US); Paul G. Nordstrom, Seattle, WA (US)

(73) Assignee: Google Inc., Mountain View, CA (US)

( * ) Notice: Subject to any disclaimer, the term of this patent is extended or adjusted under 35 U.S.C. 154(b) by 361 days.

(21) Appl. No.: 14/139,620

(22) Filed: Dec. 23, 2013

Related U.S. Application Data

(60) Provisional application No. 61/829,852, filed on May 31, 2013.

(51) Int. Cl.
G06F 15/16 (2006.01)
H04L 29/08 (2006.01)

(52) U.S. Cl.
CPC .......... H04L 67/143 (2013.01); H04L 67/141 (2013.01)

(58) Field of Classification Search
CPC . H04L 67/141; H04L 67/143; H04L 67/2819; H04L 29/08576; H04L 12/1813; H04N 7/15; H04N 7/173
USPC ................. 709/228; 348/14.09, 14.01, 14.06
See application file for complete search history.

(56) References Cited

U.S. PATENT DOCUMENTS

| | | | |
|---|---|---|---|
| 7,176,957 B2 * | 2/2007 | Ivashin | H04N 7/152 348/14.07 |
| 7,986,335 B2 * | 7/2011 | Kenoyer | H04L 29/06027 348/14.01 |
| 8,325,216 B2 * | 12/2012 | Ivashin | H04L 12/1822 348/14.09 |
| 8,416,280 B2 * | 4/2013 | Oike | H04L 12/1822 340/4.37 |
| 8,553,067 B2 * | 10/2013 | Shaffer | H04N 7/147 348/14.01 |
| 8,682,974 B2 * | 3/2014 | Eriksson | H04L 65/4038 709/204 |
| 8,890,929 B2 * | 11/2014 | Paithankar | H04N 7/152 348/14.01 |
| 9,113,033 B2 * | 8/2015 | Junuzovic | G06Q 10/101 |
| 2004/0008635 A1 * | 1/2004 | Nelson | H04N 7/152 370/260 |

(Continued)

OTHER PUBLICATIONS

"Nefsis®—Video Conferencing Guide & Online User Manual," [online] [Retrieved on Dec. 23, 2013]; Retrieved from the Internet URL: http://www.nefsis.com/manual/cc-video-quality,html; 3 pages.

(Continued)

Primary Examiner — Joseph E Avellino
Assistant Examiner — Binod J Kunwar
(74) Attorney, Agent, or Firm — Fish & Richardson P.C.

(57) ABSTRACT

Methods, systems, and apparatus, including computer programs encoded on a computer storage medium, for pausing interactive sessions. One of the methods includes initiating a live interactive session between a first user and a second user over a data communication network; during the interactive session, determining that the quality of the interactive session has become unacceptable to the first user; pausing the interactive session; while the session is paused, recording a segment of video captured by a user device of the second user; and providing the segment of video for presentation to a user device of the first user with acceptable quality.

19 Claims, 3 Drawing Sheets

(56) References Cited

U.S. PATENT DOCUMENTS

| | | | | |
|---|---|---|---|---|
| 2005/0264648 | A1* | 12/2005 | Ivashin | H04N 7/152 348/14.09 |
| 2006/0203976 | A1* | 9/2006 | Erhart | H04M 3/2227 379/88.01 |
| 2007/0086365 | A1* | 4/2007 | Chen | H04L 12/1822 370/260 |
| 2007/0273754 | A1* | 11/2007 | Cockerton | G06F 17/30817 348/14.08 |
| 2008/0267282 | A1* | 10/2008 | Kalipatnapu | H04L 12/1822 375/240.01 |
| 2010/0034363 | A1* | 2/2010 | O'Connell | H04M 1/656 379/88.23 |
| 2010/0188476 | A1* | 7/2010 | Thapa | H04N 7/15 348/14.08 |
| 2011/0137984 | A1* | 6/2011 | Kim | H04L 65/608 709/203 |
| 2011/0249086 | A1* | 10/2011 | Guo | H04N 7/147 348/14.12 |
| 2011/0267419 | A1* | 11/2011 | Quinn | H04N 7/15 348/14.08 |
| 2011/0320626 | A1* | 12/2011 | Wong | H04N 21/41407 709/231 |
| 2012/0026279 | A1* | 2/2012 | Kato | H04N 7/15 348/14.08 |
| 2012/0092438 | A1* | 4/2012 | Guzman Suarez | H04N 7/15 348/14.03 |
| 2012/0300657 | A1* | 11/2012 | Jung | H04W 24/10 370/252 |
| 2013/0094830 | A1* | 4/2013 | Stone | H04N 5/775 386/230 |
| 2013/0272508 | A1* | 10/2013 | DeLuca | H04M 1/72519 379/88.01 |
| 2014/0085404 | A1* | 3/2014 | Kleinsteiber | H04N 7/15 348/14.08 |
| 2014/0089801 | A1* | 3/2014 | Agrawal | G06F 3/0484 715/719 |
| 2014/0099071 | A1* | 4/2014 | Adcock | H04N 5/783 386/241 |
| 2014/0115114 | A1* | 4/2014 | Garmark | H04L 65/60 709/219 |
| 2014/0189064 | A1* | 7/2014 | Cilli | H04N 21/23439 709/219 |
| 2014/0253674 | A1* | 9/2014 | Grondal | H04L 65/1083 348/14.08 |

OTHER PUBLICATIONS

Watt et al., "Asynchronous Videoconferencing: A Hybrid Communication Prototype," 2002, HICSS, Proceedings of the 35th Annual Hawaii International Conference on (2002), pp. 97-105.

* cited by examiner

PAUSING INTERACTIVE SESSIONS

CROSS-REFERENCE TO RELATED APPLICATION

This application claims priority to U.S. Provisional Application No. 61/829,852, filed on May 31, 2013. The disclosure of the prior application is considered part of and is incorporated by reference in the disclosure of this application.

BACKGROUND

This specification relates to interactive environments that connect network-enabled communication devices.

People can use various types of devices, e.g., desktop computers and mobile phones, to communicate with one another using various data communication networks, e.g., the Internet.

SUMMARY

This specification describes technologies relating to pausing interactive sessions.

In general, one innovative aspect of the subject matter described in this specification can be embodied in methods that include the actions of initiating a live interactive session between a first user and a second user over a data communication network; during the interactive session, determining that the quality of the interactive session has become unacceptable to the first user; pausing the interactive session; while the session is paused, recording a segment of video captured by a user device of the second user; and providing the segment of video for presentation to a user device of the first user with acceptable quality. Other embodiments of this aspect include corresponding computer systems, apparatus, and computer programs recorded on one or more computer storage devices, each configured to perform the actions of the methods.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Pausing the interactive session can include switching the interactive session from live interaction to asynchronous interaction. Determining that the quality of the interactive session has become unacceptable to the first user can include: determining that a measure of quality of a live video feed provided to the first user during the interactive session indicates that the video feed has reached a sufficiently low quality. Determining that the quality of the interactive session has become unacceptable to the first user can include: determining that the first user has less than a threshold amount of data communication resources available for receiving or providing session-related data.

The method can further include: notifying each of the users that the interactive session has been paused. The method can further include: determining that an acceptable quality for the interactive session has been restored for to the first user; and resuming the live interactive session.

In general, another innovative aspect of the subject matter described in this specification can be embodied in methods that include the actions of initiating a live interactive session between a first user and a second user over a data communication network; during the interactive session, receiving a replay request from the first user; pausing the interactive session; while the session is paused, playing back a most-recent portion of the session to the first user; and resuming the interactive session. Other embodiments of this aspect include corresponding computer systems, apparatus, and computer programs recorded on one or more computer storage devices, each configured to perform the actions of the methods.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Receiving the replay request can include detecting a predetermined voice command from the first user. Initiating the live interactive session can include providing a live video feed and a live audio feed for presentation to the first user, and resuming the interactive session can include resuming providing the live video feed and the live audio feed for presentation to the first user. The most-recent portion of the session can be a portion of the session recorded during a most-recent time window of pre-determined duration. The most-recent portion of the session can be a portion of the session beginning after an earliest verbal pause in a sequence of most-recent verbal pauses.

Particular embodiments of the subject matter described in this specification can be implemented so as to realize one or more of the following advantages. Problems with interactive session quality, e.g., problems with the quality of audio, video, or both, provided to a user participating in an interactive session, can be reduced or eliminated. Users can participate in interactive sessions even if available bandwidth is limited. Users can easily pause interactive sessions, e.g., to play back a preceding portion of the session. For example, a user interacting with another user can easily pause the interactive session to play back a most-recent portion of the interactive session if something demonstrated or said by the other user was not clear or needed to be seen or heard again.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
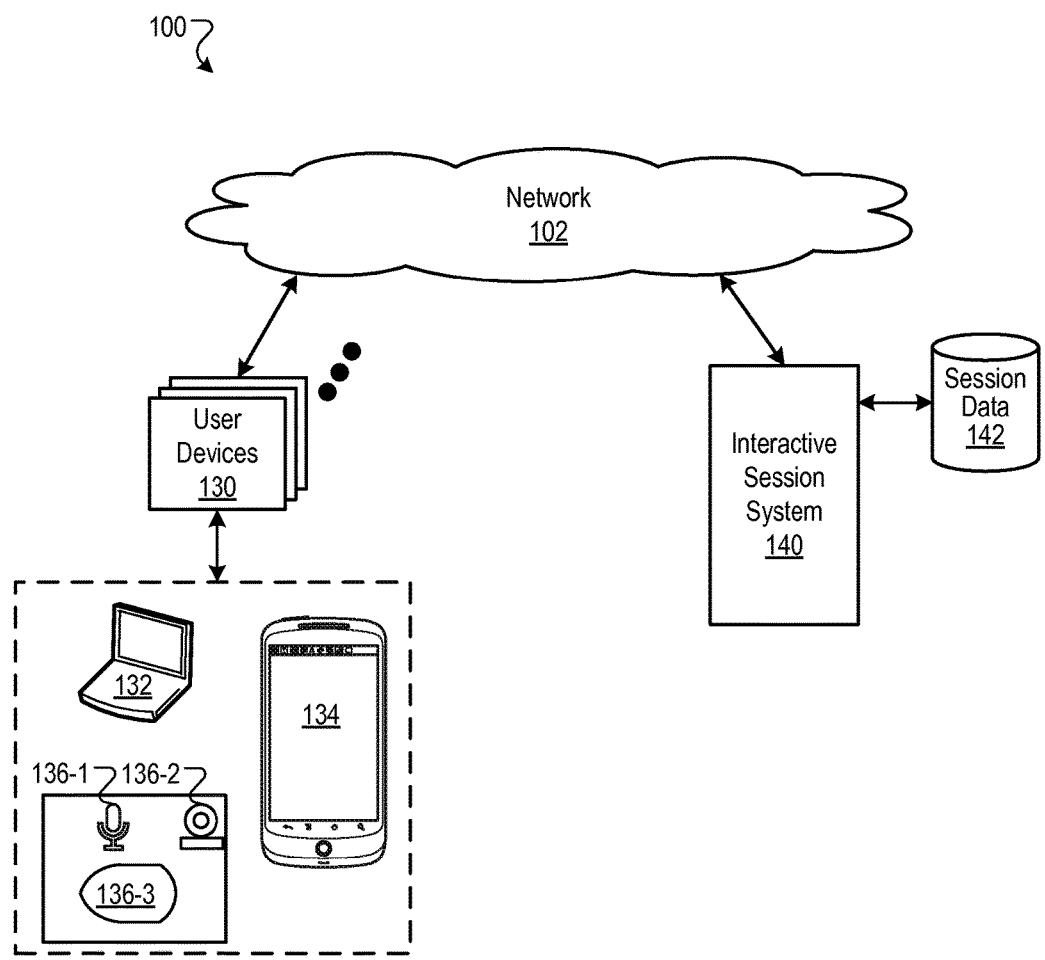
FIG. 1 shows an example interactive session system in an example operational context.

FIG. 1 shows an example interactive session system 140 in an example operational context. The interactive session system 140 is an example of a system implemented as one or more appropriately programmed computers in one or more locations, that implement the systems, components, and techniques described below.

A user can interact with the interactive session system 140 using a user device 130 through a data communication network 102. The network 102 enables data communication between multiple electronic devices. Users can access content, provide content, exchange information, and participate in interactive sessions by use of the devices and systems that can communicate with each other over the network 102. The network 102 can include, for example, a local area network (LAN), a cellular phone network, a wide area network (WAN), e.g., the Internet, or a combination of them. The links on the network can be wireline or wireless links or both.

A user device 130 is an electronic device, or collection of devices, that is capable of interacting with the interactive session system 140 over the network 102. Example user devices 130 include personal computers 132, mobile communication devices 134, and other devices that can send and receive data over the network 102. A user device 130 is typically configured with a user application, e.g., a web browser, that sends and receives data over the network 102, generally in response to user actions. The user application can enable a user to display and interact with text, images, videos, music and other content, which can be located on a web page on the World Wide Web or a local area network.

Generally, a user device 130 includes one or more of an audio input device 136-1, a video input device 136-2, a display device 136-3, and optionally other input devices, e.g., for text or gesture input.

The interactive session system 140 allows people using user devices 130 to organize, request, and participate in interactive sessions. In an interactive session, a person interacts with another person, e.g., by viewing a video feed of video being captured by the user device of the other person participating in the session. In some instances, one of the participants can act purely as an observer, i.e., information does not pass from the user device of the observer to the user device of the other person participating in the session. In other instances, however, each person can play an active role, and information goes in both directions during the session. The term "interactive session" may thus refer to such an interaction, the period of interaction, or a recording of such an interaction, as the context requires.

Interactive sessions can be recorded by the interactive session system 140 and stored as session data 142 so that they can be replayed by the users who participated in the sessions or, with the users' consent, by other users. In some implementations, in addition to or instead of being recorded and stored as session data 142, all of or a portion of a video feed provided to a user participating in an interactive session may be recorded and stored locally on the user device of the user.

Generally, during an interactive session, the interactive session system 140 provides live video feeds, live audio feeds, or both captured by user devices for presentation to other users participating in the session. A live feed is a feed that is delivered by the interactive session system 140 in real time. In some circumstances, however, the interactive session system 140 may pause an interactive session while users are participating in the session.

For example, the interactive session system 140 may pause an interactive session if the quality of the interactive session has become unacceptable for one of the participating users. That is, the interactive session system 140 switches the session from a live interaction to an asynchronous interaction, i.e., to an interaction that is delayed as long as necessary to deliver segments of the session to the user with enough fidelity to have an acceptable playback. Pausing an interactive session in response to determining that the quality of the session has become unacceptable is described below with reference to FIG. 2.

As another example, the interactive session system 140 may pause an interactive session to allow one of the users participating in the session to play back a most-recent portion of the session. Pausing an interactive session in response to receiving a request to play back a portion of the session is described in more detail below with reference to FIG. 3.

Figure 2:
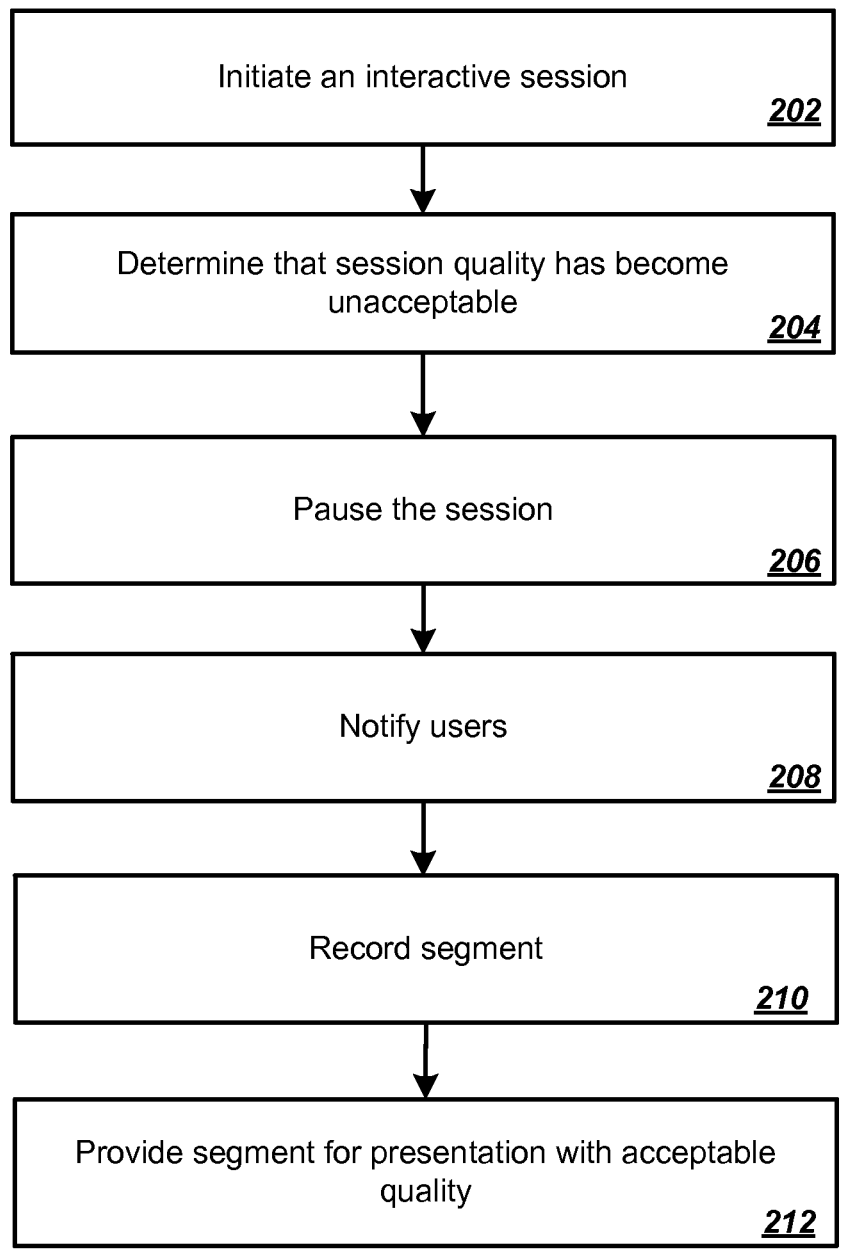
FIG. 2 is a flow diagram of an example process for pausing an interactive session to ensure a required level of session quality.

FIG. 2 is a flow diagram of an example process 200 for pausing an interactive session to ensure acceptable session quality. For convenience, the process 200 will be described as being performed by a system of one or more computers located in one or more locations. For example, an interactive session system, e.g., the interactive session system 140 of FIG. 1, appropriately programmed, can perform the process 200.

The system initiates an interactive session between two users (step 202). That is, for example, the system provides a live video feed and a live audio feed captured by the user device of each user for presentation to the other user.

During the interactive session, the system determines that the quality of the session has become unacceptable for at least one of the users participating in the session (step 204). For example, the system can determine that the video being provided to one of the users has reached a sufficiently low quality, e.g., that the frame rate has dropped below a threshold frame rate value or a video error rate has risen above a threshold error rate. As another example, the system may determine that the user has less than a threshold amount of data communication resources, e.g., bandwidth, available for receiving or providing session-related data from or to the system. As another example, the system may determine that the dropped packet rate or packet timing jitter of packets sent to or received from the user device of the user exceeds a threshold dropped packet rate or a threshold packet timing jitter, respectively.

The threshold values used by the system to determine whether quality is acceptable can vary based on the mode of communication, e.g., audio or video, on the degree of compression of the communication, or on both. Optionally, the system may determine whether the quality has become unacceptable for a user based in part on preferences provided by the user to the system. For example, users of the system may be able to specify a minimum quality that they consider acceptable, e.g., a minimum acceptable video error rate, or a qualitative observation that the system then maps to a quantitative minimum value for a quality measure.

Alternatively, the system can determine that the session quality has become unacceptable based on an input received from the user, e.g., based on receiving an input selecting a designated user interface element from one of the users participating in the interactive session, or based on receiving a voice command input indicating an unacceptable loss of quality.

The system pauses the session (step 206). That is, the session stops providing the live video feeds for presentation to each user. If there is also an audio feed, the system may continue to provide the live audio feed, if quality is acceptable, or pause the audio feed as well.

The system notifies each of the users that the session has been paused (step 208). For example, the system can transmit an audio message to each user indicating that the session has been paused. As another example, the system can provide a text message for display in place of the video feed previously being provided to each user indicating that the session has been paused. The notification can optionally indicate that the session has been paused because the session quality has become unacceptable for one of the users and identify the user. As another example, once the session has been paused, the system can display a single frame of video to the user along with a visual indicator that indicates that the session has been paused. For example, the system can outline the frame in a specified color, cause the border of the frame to flash, and so on. The frame of video that is displayed to each user can be, e.g., the last frame received by that user that has a satisfactory compression ratio. Alternatively, when the indication to pause the session is received, the system can trigger the transmission of a frame of video having a compression ratio that satisfies a specified maximum compression ratio and can then display the transmitted frame.

In some implementations, while the session is paused, the system can, rather than terminating the video feed, trigger the transmission of a low frame rate video feed that captures individual frames that each satisfy a quality threshold.

The system records a session segment, e.g., a segment of audio and video, from one of the users (step 210). In some implementations, the system selects the user that is experiencing low quality to record the initial session segment. In some other implementations, the system selects the other user participating in the session to record the initial session segment. In some other implementations, the system selects the user that was speaking when the indication that quality had become unacceptable was received or when the session was paused to record the initial session segment.

Optionally, prior to recording the segment, the system can prompt the user selected to record a segment to indicate that the recording is going to commence. While the user is recording the segment, the system may provide for display to the user, e.g., a message indicating that the user is being recorded, the last complete frame of video of sufficiently high quality received from the other user, or a count-down timer that counts down the time remaining in the segment. Further optionally, while the user is recording, the system can display an indication to the other user that the user is currently recording a segment.

In some implementations, rather than select a user to record a segment and prompt that user, the system can detect that, after the session has been paused, one of the users has begun speaking and can record a segment from that user. If the system detects that multiple users begin speaking after the session has been paused, the system may, in some implementations, record a segment only from the user that the system detected as speaking first or record a segment from both users. If the system records segments from both users, the system can deliver and present the segment from the user that spoke first with an acceptable quality as described below and then deliver and present the segment from the other user, also with an acceptable quality.

The system can determine how long of a segment to record in any of a variety of ways. For example, the segment can be of a pre-determined duration. As another example, the system may record the segment until receiving a user input indicating that the segment is complete. As yet another example, the system may determine when to stop recording the segment based on tonal inflection or other signals detected in the audio received from the user, e.g., the system may stop recording after detecting a pause that exceeds a threshold length.

The system delivers the segment for presentation to the other user with an acceptable quality (step 212). That is, the system causes the segments to be played back with acceptable quality and at full speed even if play back is delayed due to limited communication resources of the receiving user's user device.

Once the segment has been played back to the other user, the system may then record a segment of video from that user and then provide the segment for presentation to the other user with an acceptable quality. That is, the system may continue the interactive session as a session with pauses rather than as a session that provides live feeds to users, i.e., as a session that ensures that session quality is acceptable by pausing while segments are recorded and then played back to the participating users.

Alternatively, the system may determine that the session may be resumed, i.e., that acceptable session quality has been restored. For example, the system may be able to obtain error rate data from infrastructure and determine whether sufficient session quality has been restored. As another example, the system may be able to establish a different connection with the user's user device and determine that the new connection has a better quality of service guarantee. As yet another example, the system may receive an input from the user specifying that a lower video resolution is acceptable to the user and determine that sufficient bandwidth is available to deliver a live feed of sufficient quality. As another example, the system may, while the session is paused, transmit bursts of test data to the user that is experiencing the unacceptable quality to measure the data communication resources available for the interactive session and restart the session when the available resources exceed a threshold amount.

Figure 3:
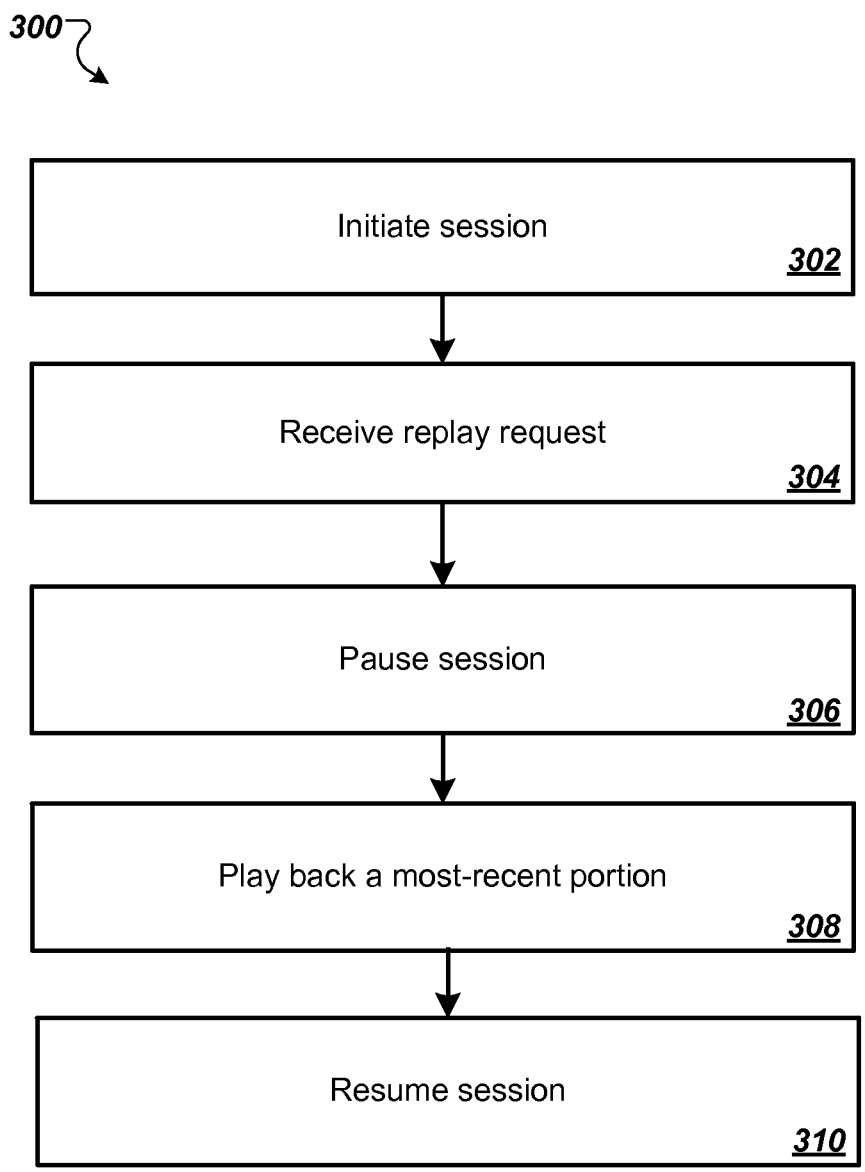
FIG. 3 is a flow diagram of an example process for pausing an interactive session to play back a portion of the session.

FIG. 3 is a flow diagram of an example process 300 for pausing an interactive session to play back a portion of the session. For convenience, the process 300 will be described as being performed by a system of one or more computers located in one or more locations. For example, an interactive session system, e.g., the interactive session system 140 of FIG. 1, appropriately programmed, can perform the process 300.

The system initiates an interactive session between two users (step 302). That is, for example, the system provides a live video feed and a live audio feed captured by the user device of each user for presentation to the other user.

During the session, the system receives a replay request from one of the users participating in the session (step 304). For example, the system may detect that one of the users has spoken a predetermined voice command, e.g., "can you repeat that," "replay," or "play back," or a predetermined voice command that was preceded by a predetermined command word. As another example, the system may receive an input submitted by the user by pressing a designated key on an input device or by selecting a designated user interface element.

The session pauses the session (step 306). That is, for example, the session stops providing the live video and audio feeds for presentation to each user.

The system plays back a most-recent portion of the session to the user from whom the replay request was received (step 308). In implementations where the system records the interactive session, the system can provide the most-recent recorded portion of the session for playback to the user. In implementations where the session is recorded by the user's user device, the system can cause the user device to play back the most-recent recorded portion of the session to the user.

The most-recent portion of the session can be, e.g., the portion of the session recorded during a most-recent time window of pre-determined duration. Alternatively, the system can detect a pre-determined most-recent number of verbal pauses or verbal pauses that are classified as meaningful by the system. The system can then identify the earliest of the detected pauses as the beginning of the segment. As another example, a command received from the user can specify a desired length of the most-recent time window, e.g., "please repeat the last ten seconds." As another example, the system may receive a user input selecting a designated rewind user interface element, e.g., a slider, that allows a user to skip back over previously received video frames, e.g., to skip back a predetermined number of frames or a predetermined number of seconds or to specify the number of frames or seconds, e.g., by dragging the slider.

Optionally, while the portion is being played back to the requesting user, the system can provide a notification to the other user participating in the session that the session is paused. Alternatively, the system can play back the portion to both users.

Once the most-recent portion of the session has been played back to the user, the system resumes the session (step 310). That is, the system resumes providing the live video feeds for presentation to the participating users.

In some implementations, rather than pausing a session in order to replay an earlier portion of the session to a requesting user, the system may allow the user the option of replaying the desired portion without pausing the live video feed. For example, the live video feed may be displayed to the user in one window while the earlier portion of the session is simultaneously displayed in another window. Further, the user may be able to select whether the audio feed corresponding to the live feed or to the earlier portion is to be played. In implementations where the system records the interactive session, the system can provide the requested portion of the session as part of the live feed, e.g., by temporarily transmitting the live feed at a lower quality in order to allow for simultaneous transmission of the recorded portion. In implementations where the session is recorded by the user's user device, the system can cause the user device to play back the requested portion of the session to the user in one window while also displaying the live feed in another window.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, e.g., web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. However, a computer need not have such devices. Moreover, a computer can be embedded in another device, e.g., a mobile telephone, a smart phone, a mobile audio or video player, a game console, a Global Positioning System (GPS) receiver, and a wearable computer device, to name just a few. Devices suitable for storing computer program instructions and data include all forms of non-volatile memory, media and memory devices, including by way of example semiconductor memory devices, magnetic disks, and the like. The processor and the memory can be supplemented by, or incorporated in, special purpose logic circuitry.

To provide for interaction with a user, embodiments of the subject matter described in this specification can be implemented on a computer having a display device for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input and output.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   initiating a live interactive session between a first user device of a first user and a second user device of a second user over a data communication network;
   during the interactive session, determining that the quality of the interactive session has become unacceptable to the first user;
   in response to determining that the quality of the interactive session has become unacceptable to the first user, pausing the interactive session and recording a first segment of video captured by the second user device while the interactive session is paused;
   providing the first segment of video captured by the second user device for presentation to the first user device with acceptable recorded quality;
   in response to determining that the first segment of video has been presented by the first user device and that acceptable interactive session quality has not yet been restored, recording a second segment of video captured by the first user device while the interactive session remains paused; and
   providing the second segment of video captured by the first user device for presentation to the second user device with acceptable recorded quality.

2. The method of claim 1, wherein determining that the quality of the interactive session has become unacceptable to the first user comprises:
   determining that a measure of quality of a live video feed provided to the first user device of the first user during the interactive session indicates that the video feed has reached a sufficiently low quality.

3. The method of claim 1, wherein determining that the quality of the interactive session has become unacceptable to the first user comprises:
   determining that the first user device of the first user has less than a threshold amount of data communication resources available for receiving or providing session-related data.

4. The method of claim 1, further comprising:
   notifying each of the users that the interactive session has been paused.

5. The method of claim 1, further comprising:
   determining that an acceptable quality for the interactive session has been restored for the first user; and
   in response to determining that an acceptable quality for the interactive session has been restored for the first user, resuming the live interactive session.

6. A method performed by one or more computers, the method comprising:
   initiating a live interactive session between a first user and a second user over a data communication network;
   during the interactive session, receiving a replay request from the first user;
   in response to receiving the replay request from the first user, pausing the interactive session and identifying a most-recent portion of the session, wherein identifying the most-recent portion of the session comprises (i) detecting a pre-determined number of most recent verbal pauses in the session and (ii) identifying an earliest verbal pause of the pre-determined number of most recent verbal pauses as a beginning of the most-recent portion of the session;
   while the session is paused, playing back the most-recent portion of the session to the first user from the beginning of the most-recent portion of the session; and
   resuming the interactive session.

7. The method of claim 6, wherein receiving the replay request comprises detecting a predetermined voice command from the first user.

8. The method of claim 6, wherein initiating the live interactive session comprises providing a live video feed and a live audio feed for presentation to the first user, and wherein resuming the interactive session comprises resuming providing the live video feed and the live audio feed for presentation to the first user.

9. A system comprising one or more computers and one or more storage devices storing instructions that, when executed by the one or more computers, cause the one or more computers to perform operations comprising:
  initiating a live interactive session between a first user device of a first user and a second user device of a second user over a data communication network;
  during the interactive session, determining that the quality of the interactive session has become unacceptable to the first user;
  in response to determining that the quality of the interactive session has become unacceptable to the first user, pausing the interactive session and recording a first segment of video captured by the second user device while the interactive session is paused;
  providing the first segment of video captured by the second user device for presentation to the first user device with acceptable recorded quality;
  in response to determining that the first segment of video has been presented by the first user device and that acceptable interactive session quality has not yet been restored, recording a second segment of video captured by the first user device while the interactive session remains paused; and
  providing the second segment of video captured by the first user device for presentation to the second user device with acceptable recorded quality.

10. The system of claim 9, wherein determining that the quality of the interactive session has become unacceptable to the first user comprises:
  determining that a measure of quality of a live video feed provided to the first user device of the first user during the interactive session indicates that the video feed has reached a sufficiently low quality.

11. The system of claim 9, wherein determining that the quality of the interactive session has become unacceptable to the first user comprises:
  determining that the first user device of the first user has less than a threshold amount of data communication resources available for receiving or providing session-related data.

12. The system of claim 9, the operations further comprising:
  notifying each of the users that the interactive session has been paused.

13. The system of claim 9, the operations further comprising:
  determining that an acceptable quality for the interactive session has been restored for the first user; and
  in response to determining that an acceptable quality for the interactive session has been restored for the first user, resuming the live interactive session.

14. The method of claim 4, wherein notifying each of the users that the interactive session has been paused comprises presenting, by each user device, the last frame of video received by the user device that satisfies a quality threshold, and a visual indicator that indicates that the session has been paused.

15. The method of claim 1, further comprising:
  in response to pausing the interactive session, providing for presentation by the first user device, a frame of video that has been captured by the second user device and that satisfies a quality threshold, and a visual indicator that indicates that the session has been paused.

16. The method of claim 1, further comprising:
  prior to recording the first segment of video, providing for presentation by the second user device, a message that indicates that recording the second user will commence;
  wherein recording the first segment of video captured by the second user device while the session is paused comprises providing for presentation by the second user device and by the first user device, a message that indicates that the second user is being recorded.

17. The method of claim 1, wherein each segment of video is recorded until a pause that exceeds a threshold length is detected in audio associated with the segment of video.

18. The method of claim 1, wherein each segment of video is recorded until user input is received from a user device that is recording the segment, that the segment of video is complete.

19. The method of claim 1, wherein each segment of video is recorded for a pre-determined duration, the method further comprising providing for presentation by a user device that is recording the segment, a count-down timer that counts down time remaining in the segment.

* * * * *